May 5, 1953     E. L. MARTIN     2,637,337
VALVE FOR SHOCK ABSORBERS

Filed Sept. 7, 1948

INVENTOR.
ERIC. L. MARTIN
BY
William P. Lane
ATTORNEY

Patented May 5, 1953

2,637,337

UNITED STATES PATENT OFFICE 2,637,337

VALVE FOR SHOCK ABSORBERS

Eric L. Martin, Santa Monica, Calif., assignor to North American Aviation, Inc.

Application September 7, 1948, Serial No. 48,101

1 Claim. (Cl. 137—498)

This invention pertains to shock absorbing means and particularly to a metering pin therefor.

It is an object of this invention to provide a shock absorber which is slightly effective insofar as light or constantly applied forces are concerned, but which is quite effective to absorb or cushion heavy or accelerated forces.

It is a further object of this invention to provide in a shock absorber unit a metering pin so proportioned and arranged as to result in the absorption by the unit of shock loads in direct proportion to the magnitude or rate of application thereof.

It is a further object of this invention to provide a shock absorber which cushions light and heavy loads as well as loads which are applied slowly or with great rapidity.

It is yet another object of this invention to provide a shock absorber which is simple in construction and has relatively few parts, yet which will operate efficiently for its intended purpose.

Figure 1:
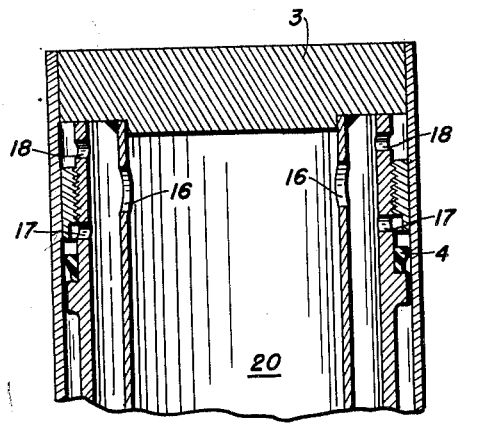
Figure 1:
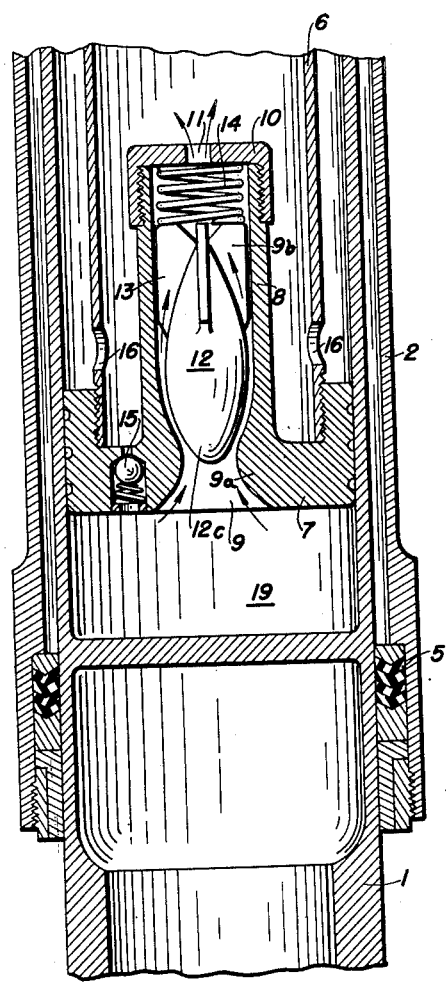
Figure 2:
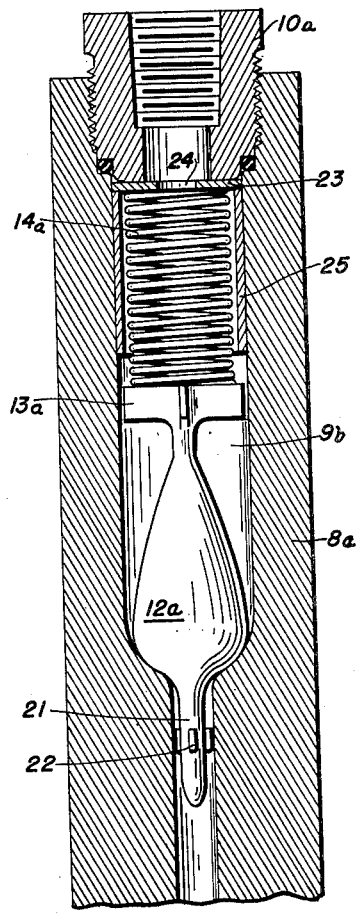

Other objects of invention will become apparent from the following description taken in conjunction with the accompanying drawing, in which Fig. 1 is a sectional view with certain parts in elevation, illustrating the invention, and Fig. 2 is a sectional view with parts in elevation illustrating a modified form of the invention.

Referring to the drawing, casing 1 is adapted to be connected in any suitable manner to a wheel (not shown) of an airplane or the like. Such casing is slidably received in cylinder 2, the upper end of which is attached to member 3 and adapted to be connected in a suitable manner to a vehicle body such as an airplane (not shown). Packings 4 and 5 are provided between the two casings in a manner well known in the art. Also secured to member 3 is a cylinder member 6 at the lower end of which is suitably attached by screw threads or the like a member 7 having a metering pin receiving portion 8, the lower end of which is provided with a passageway 9, and the upper end of which is provided with a screwthreaded cap 10 having an outlet orifice 11 therein. Received within member 8 is a metering pin 12 of substantially the configuration shown and provided with fins 13, or the like, for guiding the same within the member 8. This metering pin has a nose portion 12c, an enlarged central or intermediate portion of substantially the same cross-sectional area as said chamber, and a rearward portion that decreases in cross-sectional area from said central portion.

The metering pin utilized in the present arrangement comprises a free-floating, substantially streamlined body 12 which is positioned within the flow channel interconnecting the respective chambers 19 and 20 within the structure. A spring 14 having preselected characteristics is adapted to exert a relatively light force on the pin 12. When at rest, the nose 12c of the pin is urged into engagement with a restricted portion 9a of the flow channel whereby the floating member serves as a closure plug. The floating pin is contoured according to hydrodynamic principles and the walls of the fluid passage 9 are arranged for cooperative action to provide a Venturi effect in the flow of the fluid about the metering pin 12 when this member is displaced from a seated position.

As fluid, under pressure generated by the telescoping action of the strut under shock loads, is caused to flow between the chambers 19 and 20, the forces acting upon the surfaces of the metering pin 12 will, under the natural laws governing fluid flow relationships, have a tendency to cause a reactive effect on the floating member. This obtains from the fact of Bernoulli's theorem that pressure increases with loss of velocity. Thus, under heavy pressures, as from high shock loading, the rate of fluid flow will tend to increase sharply through the interconnecting passageway 9, the reduced portion 9a of the passageway adjacent the nose of the floating member serving to further increase this rate. The fluid, however, after passing the restricted area formed by the forward portion 12c of the plug and the passage walls, enters the enlarged area 9b of the passage towards the rear portion of the floating plug 12, at which point the rate of flow decreases, causing the floating member to move against the flow of the stream by virtue of the of the pressure differential created.

With respect to the shape of the control means, it is necessary that the forward end 12c conform to the shape of the passageway 9 in such a manner that a steady force applied in an opening direction will open the same and thus provide a passageway of predetermined area between the plug 12 and the surrounding chamber. The rearward portion of the pin or plug, however, may take the form of various configurations, depending upon the results desired. Thus it is possible to have a curved rearward portion, as shown in Fig. 1, or a sharply tapered rearward portion, as illustrated in Fig. 2. Obviously, these shapes present areas for the application of pressure forces from the fluid in the upper passageway or chamber 9b. In view of the increased area of this chamber the velocity of fluid therethrough will be lessened and the pressure will become correspondingly increased. It is within the realm of the invention to design the upper passageway with respect to the shape of the rearward portion of the pin 12 in such a manner that the desired closing force for different flows through the orifice 9a may be obtained.

It is to be understood that the contour of the floating plug will be determined by the flow characteristics which are intended to be accommodated, and these will vary according to the design of the equipment. The various factors involved which will determine the characteristics of the individual installation will readily be deetermined for each installation by those skilled in these fields of art.

Member 7 is provided with a check valve 15 for permitting return flow, while member 6 is provided with a plurality of openings 16 for obtaining a dashpot arrangement with respect to the upper portion of casing 1. Casing 1 in turn is provided with openings 17 for balancing fluid pressure on packing 4 and bleed openings 18. It is to be understood that the arrangement shown herein is to be used in a more or less conventional setting for a shock absorber wherein spring means or the like are provided for returning the casings 1 and 2 to normal position after being subjected to shock loads. As shown in Fig. 1, the relative positions of the telescoping members 1 and 2 are as they would appear with the unit at the lower limit of travel, as with the strut fully collapsed.

In the operation of the device a force applied to cause telescoping of casings 1 and 2 will cause fluid in chamber 19 to exert a force against metering pin 12, upsetting it against action of the spring 14 to permit flow through passageway 9 and by the metering pin through passageway 11 into chamber 20. In the event the force is relatively light or steadily applied, metering pin 12 will remain unseated and flow thereby will continue. However, in the event of a heavy force or a quickly applied force, fluid will first unseat metering pin 12 and then, by reason of the configuration of that pin with respect to the chamber in which it operates, and the action of the relative forces on the pin, there will result a closing movement to withstand any such suddenly applied force. In this connection, orifice 11 prevents rapid flow to the extent that forces on metering pin 12, resulting from flow thereby, will cause the pin to move toward a relatively closed position.

In a modification of the invention, illustrated in Fig. 2, pin 12a is provided with a necked-down portion 21 having guide fins 22 thereon. Fins 13a are provided at the other end thereof, corresponding to fin 13 of metering pin 12. In this modification of the invention the metering pin is received in the casing 1a and retained therein by a plug 10a which also retains a washer 23 provided with an orifice 24 corresponding to orifice 11 on cap 10. Member 8a is provided with a spring guide 25 and a relatively soft spring 14a for retaining metering pin 12a in closed position. The function and operation of the metering pin 12a is substantially identical with that of metering pin 12 since the configuration of this member will be determined by the type of installation and the requirements to be met.

It is to be understood that the present arrangement may be utilized as a flow control means for controlling the rate of flow or the volume at any given pressure. By means of this device it is possible to obtain a relatively small change in the flow under conditions which would result in a large change in pressure.

It is further to be understood that the size and shape of the plug and the orifice will vary with each installation, and depend upon results desired.

Further, means may be provided for reducing the impact force on the nose of the plug 12 by having dividing means attached to portion 8 and located in front of the nose of the plug. This dividing means may be conical or other shape so as to resist impact and assist in increasing the velocity of flow between the plug and the orifice while controlling the force on the nose of the plug.

Although the invention has been described and illustrated in detail, it is to be clearly understood that the same is by way of illustration and example only and is not to be taken by way of limitation, the spirit and scope of this invention being limited only by the terms of the appended claim.

I claim:

A flow-regulating device comprising a passageway; means defining a chamber in said passageway; orifice means at one end of said chamber; a floating plug in said chamber, said plug having a forward portion conforming generally to said orifice, an enlarged central portion of substantially the same cross-sectional area as said chamber, and a rear portion which decreases in cross-sectional area from said central portion; and second orifice means at the other end of said chamber which is more restrictive than said first orifice to prevent rapid flow through said chamber whereby a steady or gentle flow of fluid through said first orifice means will unseat the nose of said plug therefrom and hold the same in open position, whereas a sudden or large flow will create sufficient pressure in the rear part of said chamber to tend to force the plug into closed position against the direction of flow.

ERIC L. MARTIN.

References Cited in the file of this patent

UNITED STATES PATENTS

| Number | Name | Date |
|---|---|---|
| 488,220 | Pollock | Dec. 20, 1892 |
| 1,773,268 | Jenkins | Aug. 19, 1930 |
| 1,986,944 | Schoene | Jan. 8, 1935 |
| 1,988,194 | Erlandsen | Jan. 15, 1935 |
| 2,071,390 | Crowell | Feb. 23, 1937 |
| 2,095,112 | Wallace | Oct. 5, 1937 |
| 2,114,921 | Gessner | Apr. 19, 1938 |
| 2,148,497 | Peck | Feb. 28, 1939 |
| 2,161,811 | Grebe | June 13, 1939 |
| 2,280,411 | Kiene | Apr. 21, 1942 |
| 2,367,662 | Baxter | Jan. 23, 1945 |
| 2,431,769 | Parker | Dec. 2, 1947 |
| 2,439,118 | Waterman | Apr. 6, 1948 |
| 2,481,713 | Bertea | Sept. 13, 1949 |

FOREIGN PATENTS

| Number | Country | Date |
|---|---|---|
| 678,927 | France | Nov. 14, 1928 |